United States Patent [19]

Cadeddu

[11] Patent Number: 5,103,644
[45] Date of Patent: Apr. 14, 1992

[54] BIFLUIDICALLY CONTROLLED FLUID DISTRIBUTOR

[75] Inventor: Leonardo Cadeddu, Crema, Italy

[73] Assignee: Bendix Italia S.p.A., Crema, Italy

[21] Appl. No.: 720,290

[22] Filed: Jun. 25, 1991

[30] Foreign Application Priority Data

Jul. 17, 1990 [IT] Italy .................. 67551A/90

[51] Int. Cl.[5] .................. F15B 13/02; F15B 11/08
[52] U.S. Cl. ................ 60/565; 91/433; 137/625.64; 137/625.66
[58] Field of Search ............ 91/433; 137/625.64, 137/625.66; 60/565, 566

[56] References Cited

FOREIGN PATENT DOCUMENTS 2253646 7/1975 France .
2612464 9/1988 France .
2143915 2/1985 United Kingdom .

*Primary Examiner*—Gerald A. Michalsky
*Attorney, Agent, or Firm*—Larry J. Palguta; Ken C. Decker

[57] ABSTRACT

A bifluidically controlled distributor of a fluid coming from a first source (11) of fluid under high presure, comprises, in a blind bore (1) made in a body, a sliding piston (3) defining, with a plug of the bore, a first control chamber (5) connected to a first source of control fluid, a slide (9) ensuring communication between the first source (11) of fluid under high pressure or a reservoir (13) of fluid under low pressure, and an outlet conduit (15) for the distributed fluid. The bore (1) and the piston (3) are stepped correspondingly so as to determine between them a reaction chamber (25) connected permanently to the outlet conduit (15) and a second control chamber (21) is formed between the slide (9) and the piston (3) and is connected to a second source of control fluid.

4 Claims, 1 Drawing Sheet

BIFLUIDICALLY CONTROLLED FLUID DISTRIBUTOR

BACKGROUND OF THE INVENTION

The present invention relates to a bifluidically controlled distributor of a fluid coming from a source under a first pressure. Such a distributor is used particularly in hydraulic actuators controllable manually or automatically, for example, clutch actuators for motor vehicles.

More specifically, the invention relates to a bifluidically controlled distributor of a fluid coming from a first source of fluid under high pressure, comprising, in a blind bore made in a body, a sliding piston, defining, with a plug of the bore, a first control chamber connected to a first source of control fluid, a slide ensuring communication between the first source of fluid under high pressure, or a reservoir of fluid under low pressure and an outlet conduit for the distributed fluid, the slide being returned to the rest position up against the piston by an elastic means.

SUMMARY OF THE INVENTION

According to the invention, the bore and the piston are stepped correspondingly, so as to determine between them a reaction chamber connected permanently to the outlet conduit, and a second control chamber formed between the slide and the piston is connected to a second source of control fluid.

Preferably, this second source of control fluid is controlled by a solenoid valve, for example of the proportional type.

The invention also relates to a hydraulic actuator comprising at least one piston and two working chambers isolated from one another, and comprising a distributor of the abovementioned type, of which the outlet conduit for the distributed fluid is connected to one of the working chambers and the first control chamber of which is connected to the other of the working chambers.

BRIEF DESCRIPTION OF THE DRAWINGS

The invention will now be described by way of example with reference to the accompanying drawings in which.

DETAILED DESCRIPTION OF THE INVENTION

Figures 1, 2:
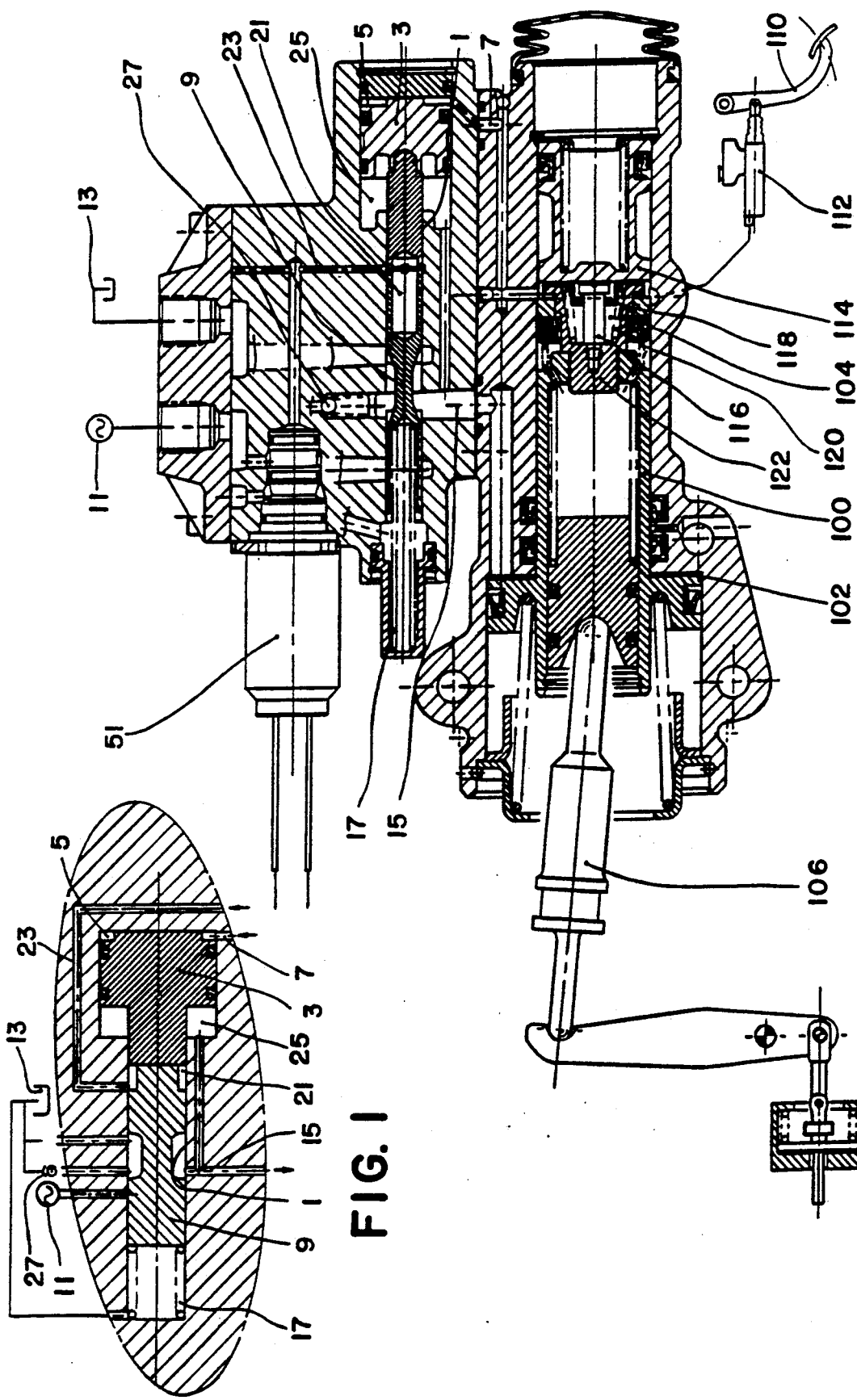
FIG. 1 shows a distributor according to the invention diagrammatically in section.
FIG. 2 shows diagrammatically, a hydraulic actuator incorporating the distributor of FIG. 1.

Referring now to FIG. 1, the distributor illustrated has a stepped blind bore 1 made in a body. A correspondingly stepped piston 3 slides in this bore 1 and defines with the latter a first working chamber 5, to which is connected a conduit 7 connected to a first source of control fluid (for example, the pressure transmitter 112 controlled by a pedal 110 as shown in FIG. 2).

A slide 9 normally bearing on the piston 3, ensures communication between a source of fluid under high pressure 11, or a reservoir of fluid under low pressure 13, and an outlet conduit 15 connected to the user circuit. A return spring 17 ensures the positioning of the slide 9 and the piston 3 at rest.

A reaction chamber 25 likewise formed between the bore 1 and the piston 3 is connected permanently to the conduit 15, that is to say to the user circuit, thus making this distributor a balanced distributor.

As mentioned above, a second control chamber 21 is formed between the slide 9 and the piston 3. This chamber is connected to a second source of control fluid by means of a conduit 23.

The operation of this distributor will be described in relation to the assembly illustrated in FIG. 2, to which the abovementioned references have been transferred.

FIG. 2 illustrates the above-described distributor in one of the uses for controlling a hydraulic clutch actuator.

In the example shown, the actuator is of the wear take-up type, but this is not necessary. It comprises essentially a stepped piston 100 defining with a corresponding bore two working chambers 102 and 104. This piston 100 ensures the displacement of an output rod 106 controlling a clutch. A pedal 110 makes it possible to actuate a transmitter 112 connected to the working chamber 104 and to the inlet 7 of the control chamber 5 of the distributor. The outlet conduit 15 of the distributor is connected to the other working chamber 102 of the actuator.

The device thus operates in the manual mode. When the driver presses on the pedal 110, he generates a pressure which causes the piston 100 to slide and the piston 3 displaces the slide 9. A fluid under pressure is thus delivered via the conduit 15 to the working chamber 102, thereby determining a clutch release boost. It should be noted that, by means of the balanced distributor according to the invention, the boosted pressure, that is to say the pressure of the fluid in the working chamber 102, is proportional to that prevailing in the working chamber 104, and the driver can therefore control the action completely since the pressure in the reaction chamber 25 gives him a sensation of the pedal.

The device can also operate with an electrical control.

The solenoid valve 51 is, in this case, energized with a current of an intensity proportional to the control pressure. A fluid, the pressure of which is modulated by the solenoid valve 51, is delivered via the conduit 23 to the second control chamber 21, thereby bringing about a displacement of the slide 9 and consequently defining the pressure of the fluid distributed to the working chamber 102 via the outlet 15. The piston 3 then remains stationary in the rest position as shown.

It will be seen that a moveable piston 114 of a type known per se will be displaced at the same time as the piston 100 of the actuator, in order to prevent the working chamber 104 from substantially increasing its volume, that is to say to prevent a circulation of fluid between the transmitter 112 and the chamber 104.

In fact, the fluid under pressure in the working chamber 102 displaces the piston 100 (to the left in FIG. 2), driving the piston 122 fixed to it. A conical spring 120, which has a load higher than that of the spring located in the inner chamber of the piston 100, keeps the latter in the rest position. When the piston 122 comes in contact with the annular gasket forming a shutter and thus closes the passage of the fluid between the chamber 104 and the inner chamber of the piston 100, the latter is isolated and forms a hydraulic wall. A screw 116 fixed to the pistons 100 and 122 then comes in contact with a stop 118 of the spring 120. The pistons 100, 122 and the screw 116, continuing to be displaced, bring about the displacement of the stop 118, the result of which is to cancel the effect of the spring 120 on the piston 114. The latter is then displaced together with the assembly as a whole by means of a spring carefully arranged in relation to this piston 114.

It must also be noted, that while the actuator illustrated operates in one mode, the other mode can be selected by the driver without any negative effect.

Finally, as a result of the separation of the two fluidic circuits, a failure of one of them does not prevent the other circuit from operating.

A conduit equipped with a unidirectional valve 27 makes it possible to provide a passage between the reservoir 13 and the chamber 102 in the event of a failure of the source 11, thereby making it possible to prevent any vacuum in this chamber 102.

An average person skilled in the art will have understood that many modifications can be made to the present invention, without departing from the scope of the invention, as defined by the accompanying claims.

In particular, the preferred solenoid valve 51 is of the proportional type. However, it would also be possible to use a conventional solenoid valve operating in the all-or-nothing mode with a control of its beat frequency.

What we claim is:

1. A bifluidically controlled distributor of a fluid coming from a first source of a fluid under high pressure, comprising, in a blind bore made in a body, a sliding piston defining, with a plug of the bore, a first control chamber connected to a first source of control fluid, a slide ensuring communication between one of said first source of fluid under high pressure and a reservoir of fluid under low pressure and an outlet conduit for the distributed fluid, said slide being returned to a rest position up against said piston by elastic means, said bore and said piston being stepped correspondingly, so as to determine between them a reaction chamber connected permanently to said outlet conduit and in that a second control chamber being formed between said slide and said piston and being connected to a second source of control fluid.

2. The device according to claim 1, wherein said second source of control fluid is controlled by a solenoid valve.

3. The device according to claim 2, wherein said solenoid valve is a proportional solenoid valve.

4. A hydraulic actuator comprising at least one piston and two working chambers isolated from one another, a bifluidically controlled distributor of a fluid coming from a first source of a fluid under high pressure, comprising, in a blind bore made in a body, a sliding piston defining, with a plug of the bore, a first control chamber connected to a first source of control fluid, a slide ensuring communication between one of said first source of fluid under high pressure and a reservoir of fluid under low pressure and an outlet conduit for the distributed fluid, said slide being returned to a rest position up against said piston by elastic means, said bore and said piston being stepped correspondingly, so as to determine between them a reaction chamber connected permanently to said outlet conduit and in that a second control chamber being formed between said slide and said piston and being connected to a second source of control fluid, the outlet conduit of said actuator for the distributed fluid being connected to one of said working chambers, the first control chamber of which said actuator being connected to the other of said working chambers.

* * * * *